(12) United States Patent
Chou et al.

(10) Patent No.: US 8,106,951 B2
(45) Date of Patent: Jan. 31, 2012

(54) METHOD FOR ADJUSTING SHOOTING CONDITION OF DIGITAL CAMERA THROUGH MOTION DETECTION

(75) Inventors: Hong-Long Chou, Taipei (TW); Chia-Chun Tseng, Hsinchu (TW)

(73) Assignee: Altek Corporation, Hsinchu (TW)

( * ) Notice: Subject to any disclaimer, the term of this patent is extended or adjusted under 35 U.S.C. 154(b) by 175 days.

(21) Appl. No.: 12/755,257

(22) Filed: Apr. 6, 2010

(65) Prior Publication Data

US 2011/0157392 A1   Jun. 30, 2011

(30) Foreign Application Priority Data

Dec. 30, 2009  (TW) .............................. 98145997 A

(51) Int. Cl.
*H04N 5/228* (2006.01)
(52) U.S. Cl. .............. 348/208.6; 348/208.1; 348/208.99
(58) Field of Classification Search .................. None
See application file for complete search history.

(56) References Cited

U.S. PATENT DOCUMENTS

| | | | | |
|---|---|---|---|---|
| 6,212,237 B1 * | 4/2001 | Minami et al. | ........... | 375/240.16 |
| 6,512,537 B1 * | 1/2003 | Shimizu et al. | ........... | 348/155 |
| 7,649,549 B2 * | 1/2010 | Batur | ........... | 348/208.6 |
| 7,728,909 B2 * | 6/2010 | Poon | ........... | 348/451 |
| 7,969,470 B2 * | 6/2011 | Kishida | ........... | 348/208.14 |
| 8,040,379 B2 * | 10/2011 | Makino et al. | ........... | 348/208.16 |
| 2007/0133686 A1 * | 6/2007 | Lee et al. | ........... | 375/240.16 |
| 2009/0316044 A1 * | 12/2009 | Chen et al. | ........... | 348/441 |

* cited by examiner

*Primary Examiner* — Justin P Misleh
(74) *Attorney, Agent, or Firm* — Morris Manning & Martin LLP; Tim Tingkang Xia, Esq.

(57) ABSTRACT

A method for adjusting a shooting condition of a digital camera through motion detection is applied to determine a shooting parameter of the digital camera. The adjusting method includes the following steps. At least two consecutive images, namely a first pre-capture image and a second pre-capture image, are selected. The first pre-capture image and the second pre-capture image are divided into a plurality of selection blocks. A motion vector of each selection block is calculated. The motion vector of each selection block is used to generate a background dominant motion vector of the camera sloshing and a self-movement vector of the shot object. The background dominant motion vector is subtracted from the self-movement vector of the shot object, so as to obtain a corrected foreground motion vector. According to the size of the corrected foreground motion vector, the corresponding shooting parameter is determined.

5 Claims, 9 Drawing Sheets

Sum absolution difference (SAD) of background blocks

METHOD FOR ADJUSTING SHOOTING CONDITION OF DIGITAL CAMERA THROUGH MOTION DETECTION

CROSS-REFERENCE TO RELATED APPLICATIONS

This non-provisional application claims priority under 35 U.S.C. §119(a) on Patent Application No(s). 098145997 filed in Taiwan, R.O.C. on Dec. 30, 2009, the entire contents of which are hereby incorporated by reference.

BACKGROUND OF THE INVENTION

1. Field of Invention

The present invention relates to a method for adjusting a shooting condition of a digital image, and more particularly to a method for adjusting a shooting condition through motion detection.

2. Related Art

Along with the rapid development of the digital camera, most people like to record a memorable moment through photographing. However, when a traditional camera utilizing films or a digital camera is used to take photographs, some blurred images may be generated due to the user's unstable holding of the camera. Since the camera is held by hand, the hand shake problem cannot be avoided. The difference of the holding stability of different person causes the involuntary displacement at the instant when the shutter is pressed. In order to avoid the blurred image caused by the hand shake, the manufacturer of the digital camera corrects the blurred image in a manner of hardware or software.

Different digital camera manufacturers employ different anti-shake mechanisms. The commonly known anti-shake methods usually include increasing the photosensitivity (ISO), increasing the shutter speed, or increasing the aperture values. The aforementioned various methods are all used to reduce the shutter speed, thereby reducing the influence of the hand shake on the digital image. However, the aforementioned methods all have some defects. In view of the adjusting manner and hardware cost, the method of adjusting the photosensitivity is cheaper than the other methods. However, increasing the photosensitivity may cause a larger noise, which reduces the imaging quality of the digital image. Adjusting the shutter speed and the aperture value may reduce the light receiving amount of the photosensitive element, thereby affecting the imaging luminance of the digital image.

Besides, the clearness of the digital image is also affected by the movement of the shot object. During the sloshing of the shot object, if the shooting is done under a low shutter speed, the obtained digital images may also be blurred. Thus, someone has proposed that the shake of the digital camera and the sloshing of the shot object can be respectively detected, and the shooting condition of the digital image is compensated according to the movement vectors of the shake of the digital camera and the sloshing of the shot object, thereby minimizing the influence of the factors on shooting.

In the prior art, several consecutive images are captured, and the analysis on the camera shake and the sloshing of the shot object is conducted according to the displacement of each pixel in the consecutive images. Referring to FIG. 1, a schematic view of a pixel calculation for a digital image according to the prior art is shown. The upper left side and upper right side of FIG. 1 show two consecutive digital images 111 and 112. By analyzing each pixel, the movement change of the camera and the shot object can be effectively found out (assuming that the shot object is a face in FIG. 1). In other words, the movement change is indicated by the arrows at the lower part of FIG. 1. However, being limited by the inherent calculation capability, the digital camera with a common performance cannot accomplish calculating all the pixels in the digital image.

SUMMARY OF THE INVENTION

In view of the above problems, the present invention is a method for adjusting a shooting condition of a digital camera through motion detection, which is applied to determine a shooting parameter of the digital camera according to sloshing of the digital camera or a shot object when the digital camera shoots a digital image.

In order to achieve the aforementioned objective, the present invention provides a method for adjusting a shooting condition of a digital camera through motion detection, which comprises the following steps. Two consecutive frames of pre-capture images are captured and defined as a first pre-capture image and a second pre-capture image respectively. The first pre-capture image and the second pre-capture image are divided into a plurality of selection blocks, and each of the selection blocks is corresponding to the same area in the first pre-capture image and the second pre-capture image. A difference of each of the selection blocks in the first pre-capture image as compared with the second pre-capture image is calculated, so as to obtain a motion vector of the selection block. According to a movement amount of the motion vectors of the selection blocks, the motion vectors reaching a first threshold value are selected and defined as first dominant motion vectors. According to a movement direction of the first dominant motion vectors, the first dominant motion vectors reaching a second threshold value are selected and defined as second dominant motion vectors. A foreground area is set at the same position in the first pre-capture image and in the second pre-capture image, and other areas are set as a background area, the selection blocks located at the foreground area are defined as foreground blocks, and the selection blocks located at the background area are defined as background blocks. A statistic procedure is performed on the second dominant motion vectors in all the background blocks to select a background dominant motion vector. A corrected foreground motion vector is calculated by using the background dominant motion vector and the second dominant motion vectors in the foreground blocks. A condition look-up table is looked up according to the corrected foreground motion vector, so as to obtain the corresponding shooting parameter.

The present invention provides the identification of the shake of the digital camera and the sloshing of the shot object through motion detection. When the shake of the digital camera is detected, the camera movement vector (i.e., the shake of the digital camera) is subtracted from the object movement vector (i.e., the sloshing of the shot object) in the digital image, so as to obtain the sloshing degree of the shot object. Finally, the digital camera adjusts the shooting condition according to the above result. Thereby, the quality degrade of the digital image caused by the higher shooting condition can be avoided.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
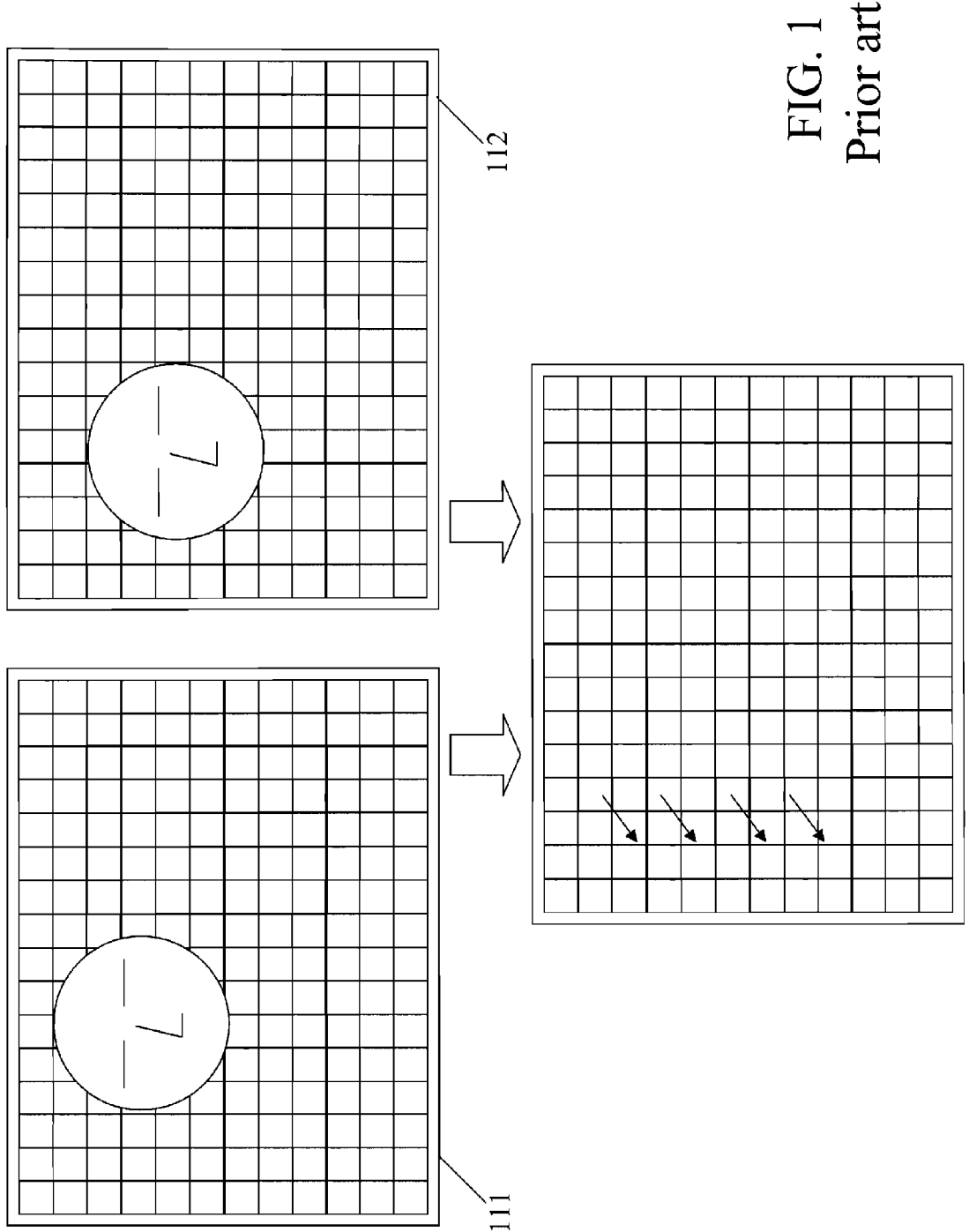
FIG. 1 is a schematic view of a pixel calculation for a digital image according to the prior art.
Figure 2:
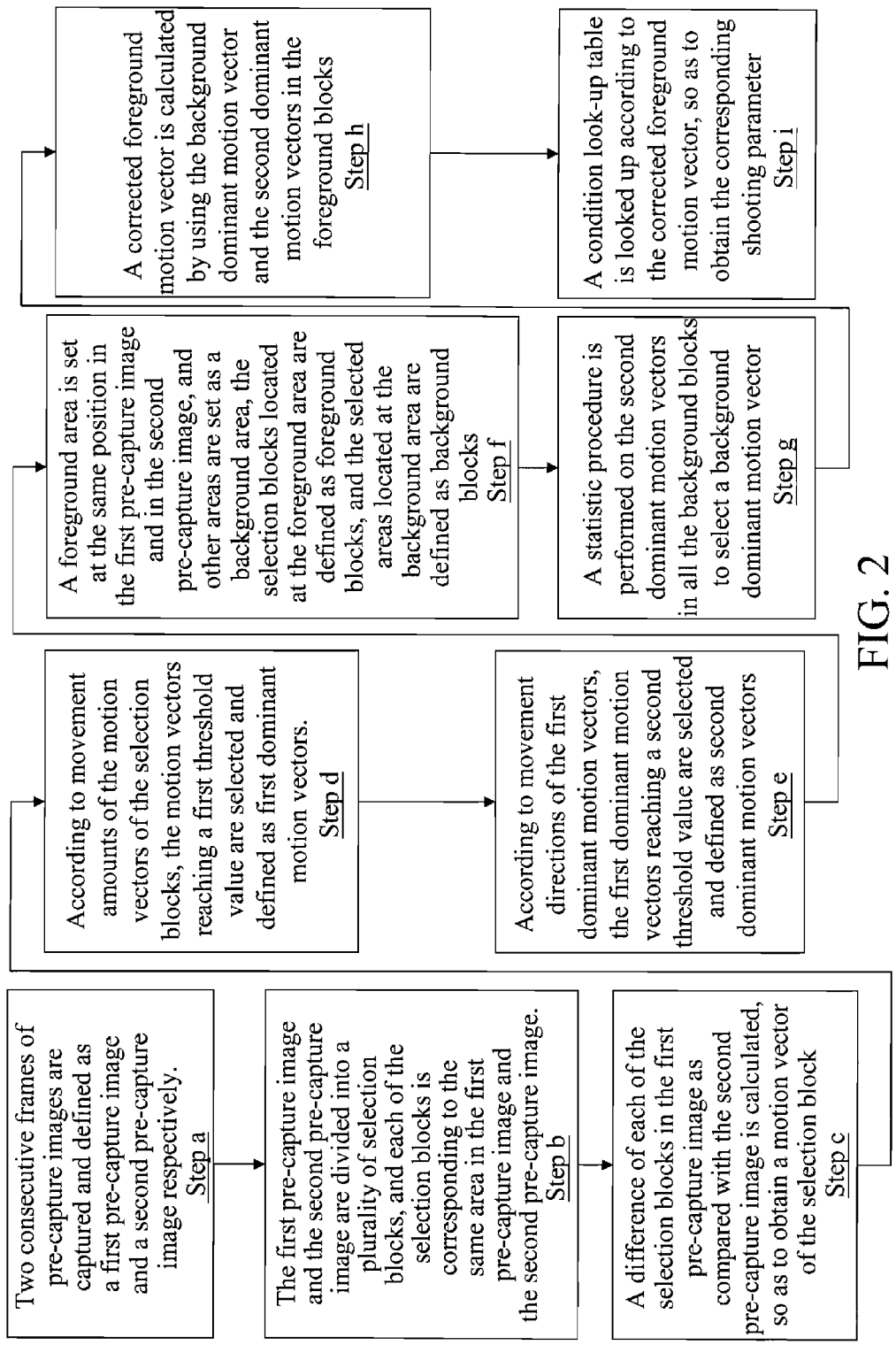
FIG. 2 is a schematic view of an operation flow according to the present invention.

The present invention is applied in an electronic device with an image processing function, such as a personal computer, a digital video camera, and a digital camera. It should be noted that, the present invention is not limited to the aforementioned examples. Further, in the present invention, a plurality of consecutive images is captured, and the motion vector of each image is analyzed. Then the sloshing degree of the camera and the motion of the shot object are determined from the motion vectors. A corresponding shooting condition is determined according to the sloshing and motion degrees. In order to clearly illustrate the operation of the present invention, hereinafter two consecutive pre-capture images are taken as an example for illustration, but the present invention is not limited to this. Referring to FIG. 2, a schematic view of an operation flow according to the present invention is shown. The operation steps of the present invention are described as follows.

In Step a, two consecutive frames of pre-capture images are captured and defined as a first pre-capture image and a second pre-capture image respectively.

In Step b, the first pre-capture image and the second pre-capture image are divided into a plurality of selection blocks, and each of the selection blocks is corresponding to the same area in the first pre-capture image and the second pre-capture image.

In Step c, a difference of each of the selection blocks in the first pre-capture image as compared with the second pre-capture image is calculated, so as to obtain a motion vector of each selection block;

In Step d, according to movement amounts of the motion vectors of the selection blocks, the motion vectors reaching a first threshold value are selected and defined as first dominant motion vectors.

In Step e, according to movement directions of the first dominant motion vectors, the first dominant motion vectors reaching a second threshold value are selected and defined as second dominant motion vectors.

In Step f, a foreground area is set at the same position in the first pre-capture image and in the second pre-capture image, and other areas are set as a background area, the selection blocks located at the foreground area are defined as foreground blocks, and the selected areas located at the background area are defined as background blocks.

In Step g, a statistic procedure is performed on the second dominant motion vectors in all the background blocks to select a background dominant motion vector.

In Step h, a corrected foreground motion vector is calculated by using the background dominant motion vector and the second dominant motion vectors in the foreground block.

In Step i, a condition look-up table is looked up according to the corrected foreground motion vector, so as to obtain the corresponding shooting parameter.

Figure 3A:
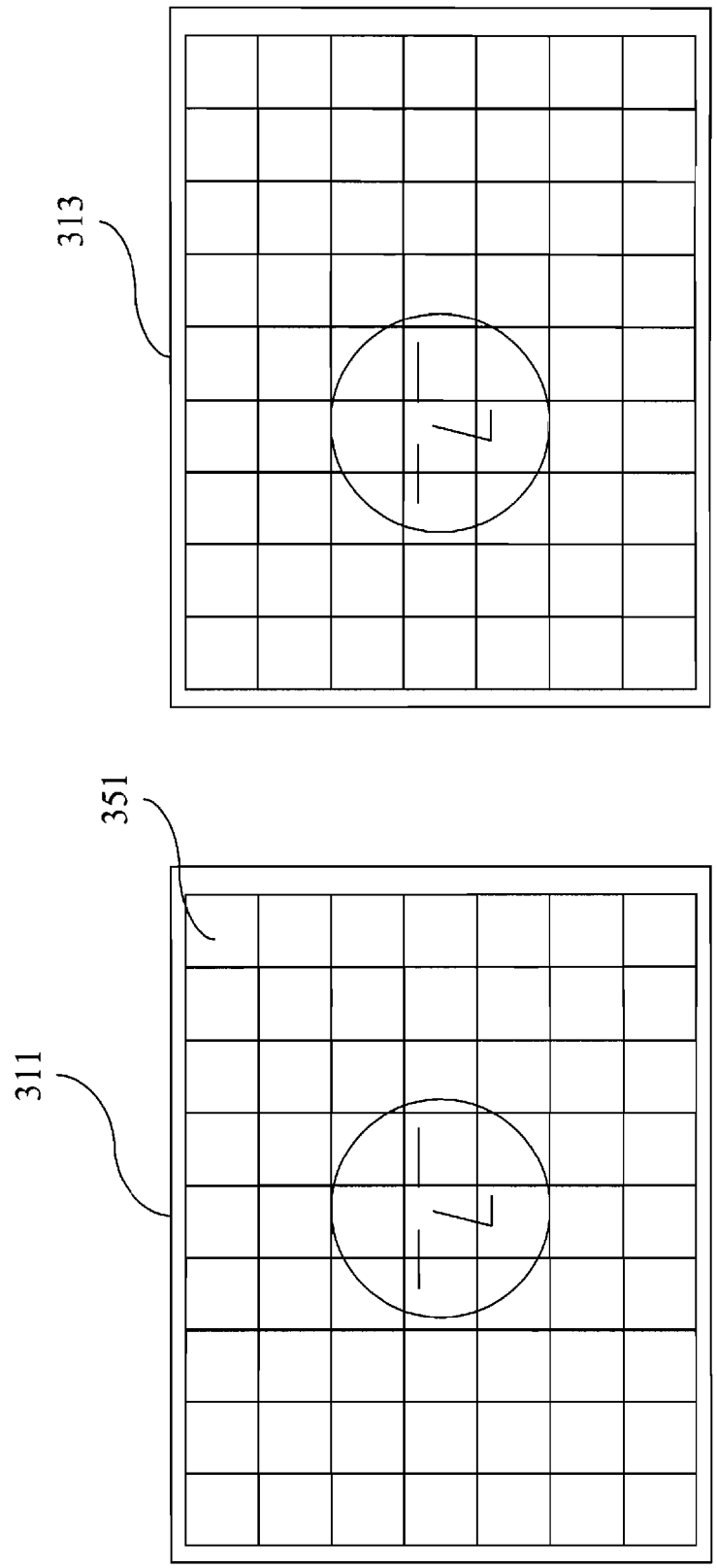
FIG. 3A is a schematic view of a first pre-capture image and a second pre-capture image according to the present invention.
Figure 3B:
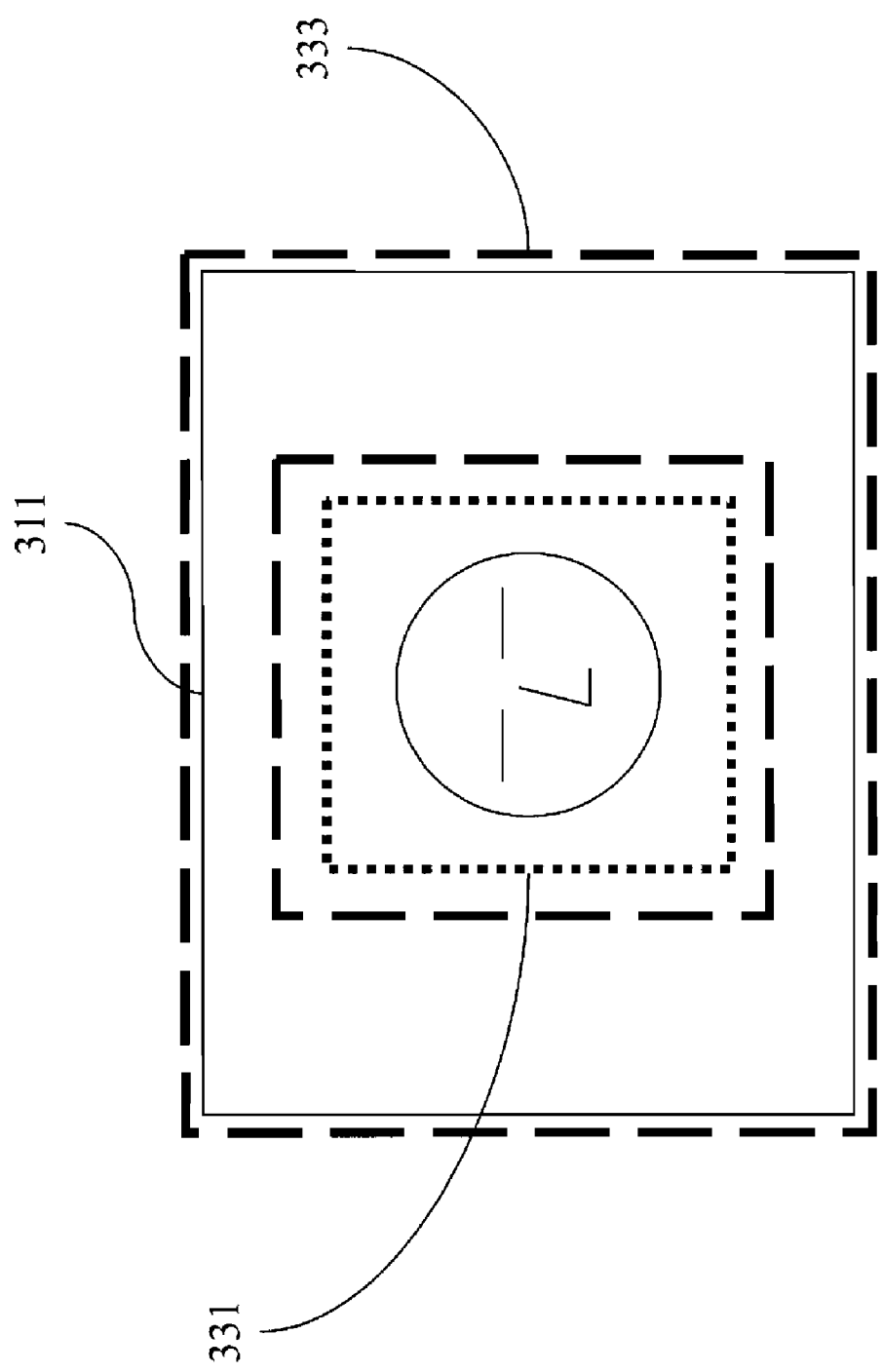
FIG. 3B is a schematic view of a foreground area and a background area according to the present invention.

Referring to FIG. 3A at the same time, a schematic view of the first pre-capture image and the second pre-capture image is shown. The left side of FIG. 3A shows a first pre-capture image 311; and the right side of the FIG. 3A shows a second pre-capture image 313. Next, a foreground area 331 and a background area 333 are set on the same positions of the first pre-capture image 311 and the second pre-capture image 313. In other words, the foreground area 331 respectively selects the same position of the first pre-capture image 311 and the second pre-capture image 313. Referring to FIG. 3B, a schematic view of a foreground area and a background area is shown. In order to clearly illustrate the difference between the foreground area 331 and the background area 333, the foreground area 331 in FIG. 3B is shown as a human face (black short dashed line box), and the background area 333 is represented by a black long dashed line box.

The size of the foreground area 331 can be set through the face detection. The digital camera executes the loading of a face detection procedure. During the view finding or shooting process, the digital camera determines whether a face exists in the captured image. If a face exists in the captured image, the face in the digital image is circled, and the area is defined as the foreground area 331, as shown in FIG. 3B. Otherwise, an arbitrary specific area is specified as a foreground.

The size of a pixel array of the selection block 351 is determined according to the digital image or the calculation capability of the digital camera. For example, in a small digital image or a camera with a low processing speed, the selection block 351 is set as a pixel array of 3*3; while in a large digital image or a camera with a high processing speed, the selection block 351 is set as a pixel array larger than 5*5 or 7*7.

Figure 3C:
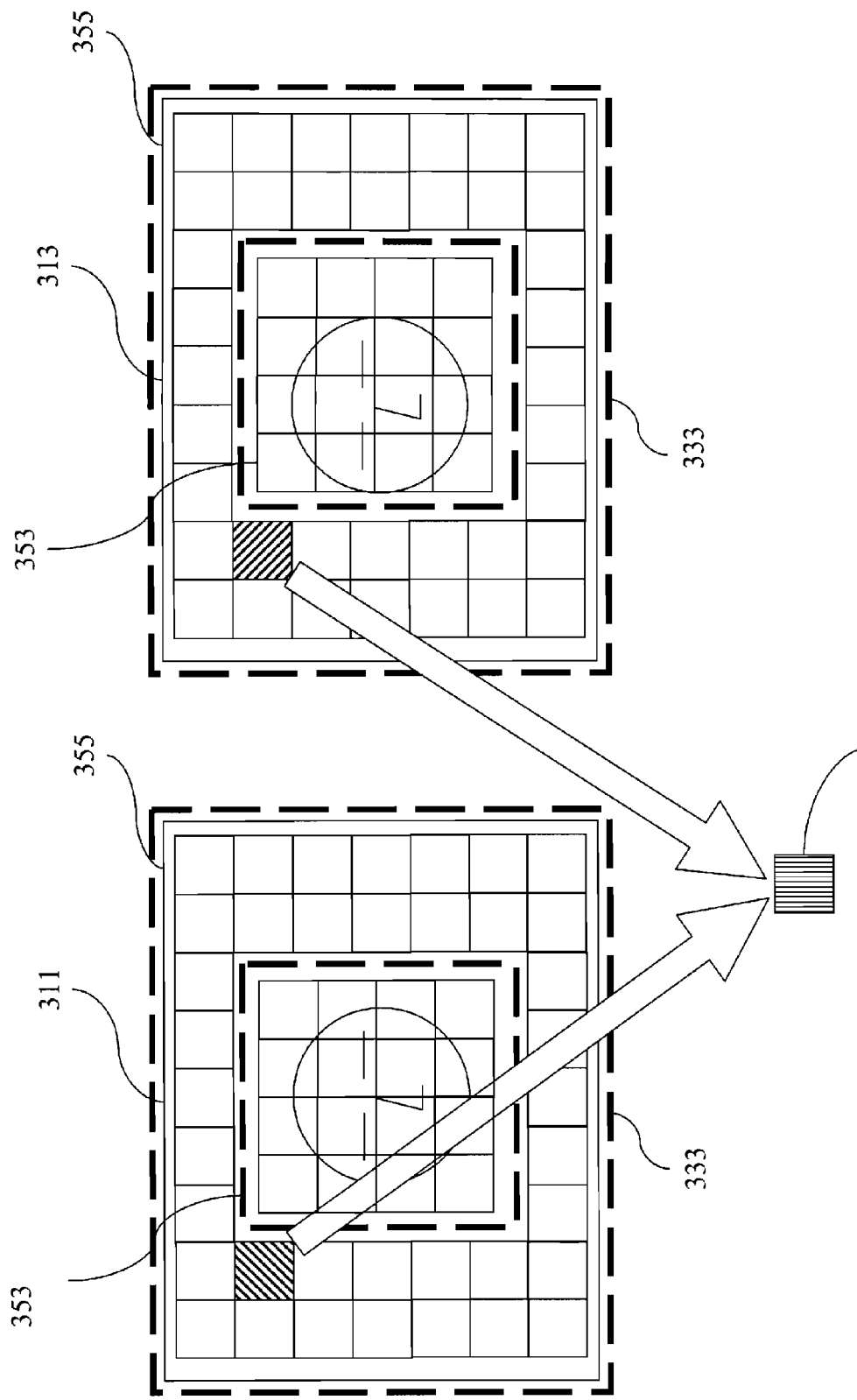
FIG. 3C is a schematic view of calculating an sum absolution difference (SAD) according to the present invention.
Figure 3D:
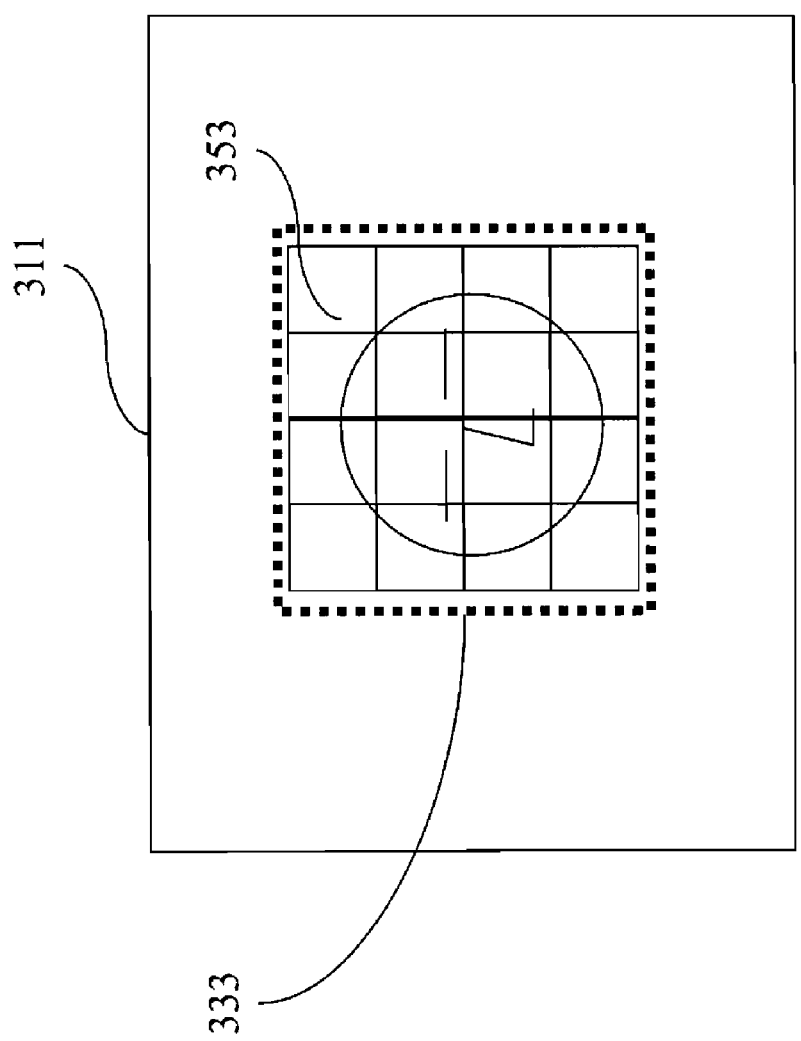
FIG. 3D is a schematic view of foreground blocks according to the present invention.

Then, the motion vector of each selection block 351 in the first pre-capture image 311 relative to the second pre-capture image 313 is calculated. The methods of calculating the motion vector include sum absolution difference (SAD) algorithm or sum of squared difference (SSD). Referring to FIG. 3C at the same time, a schematic view of calculating the SAD is shown. The left side of FIG. 3C shows the first pre-capture image 311; and the right side of the FIG. 3C shows the second pre-capture image 313. After the motion vectors of all the selection blocks 351 are acquired, the motion vectors reaching a first threshold value are selected from all the motion vectors according to the movement amounts of the motion vectors, and the group of the selected motion vectors is defined as the first dominant motion vectors. In the first dominant motion vectors, according to the movement directions of the first dominant motion vectors, the first dominant motion vectors reaching a second threshold value are selected and defined as the second dominant motion vectors.

In order to clearly distinguish the selection blocks 351 in different areas, the selection blocks 351 located in the foreground area are defined as foreground blocks 353, and the selection blocks 351 located in the background area are defined as background blocks 355. In FIG. 3B, the foreground area 331 is further divided into a plurality of foreground blocks 353, and the background area 333 is further divided into a plurality of background blocks 355. Referring to FIG.

Figure 3E:
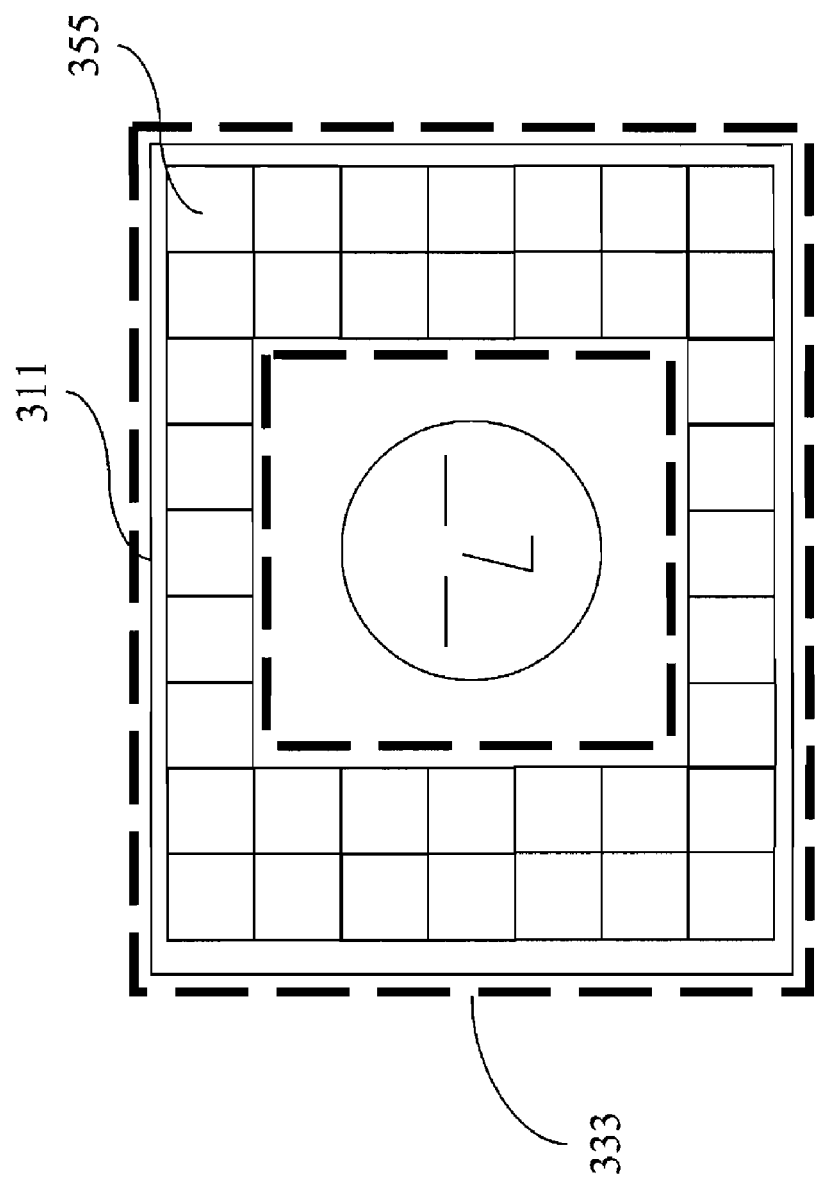
FIG. 3E is a schematic view of background blocks according to the present invention.

3D and FIG. 3E at the same time, schematic views of the foreground blocks and the background blocks are respectively shown.

Figure 3F:
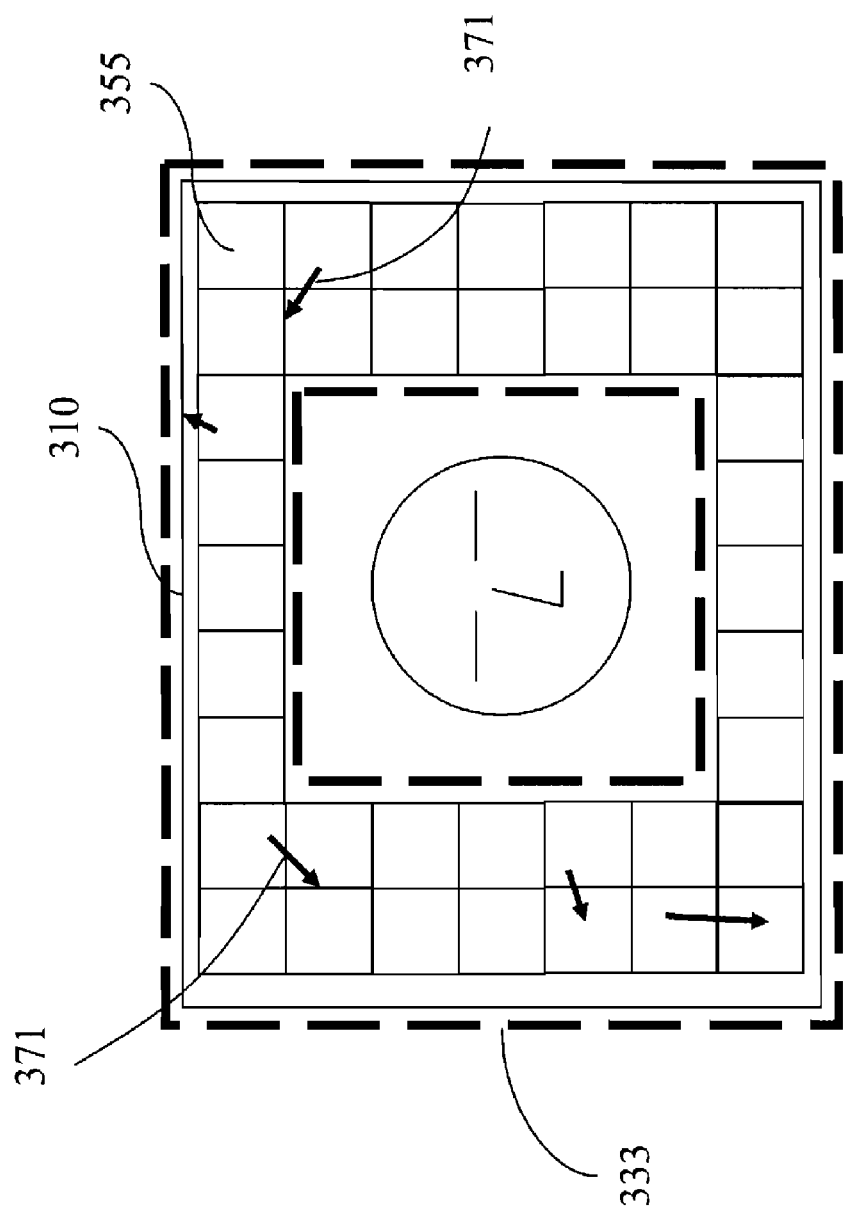
FIG. 3F is a schematic view of second dominant motion vectors in the background area according to the present invention.

Referring to FIG. 3F, a schematic view of the second dominant motion vectors in the background area is shown. A statistic procedure is performed on the second dominant motion vectors 371 in all the background blocks 355, so as to select a background dominant motion vector (not shown). The statistic procedure performs a classified statistic on the second dominant motion vectors 371 through a linear regression to find out the size and direction of the dominant motion of the background sloshing. The black arrows in FIG. 3F represent the second dominant motion vectors 371.

Figure 3G:
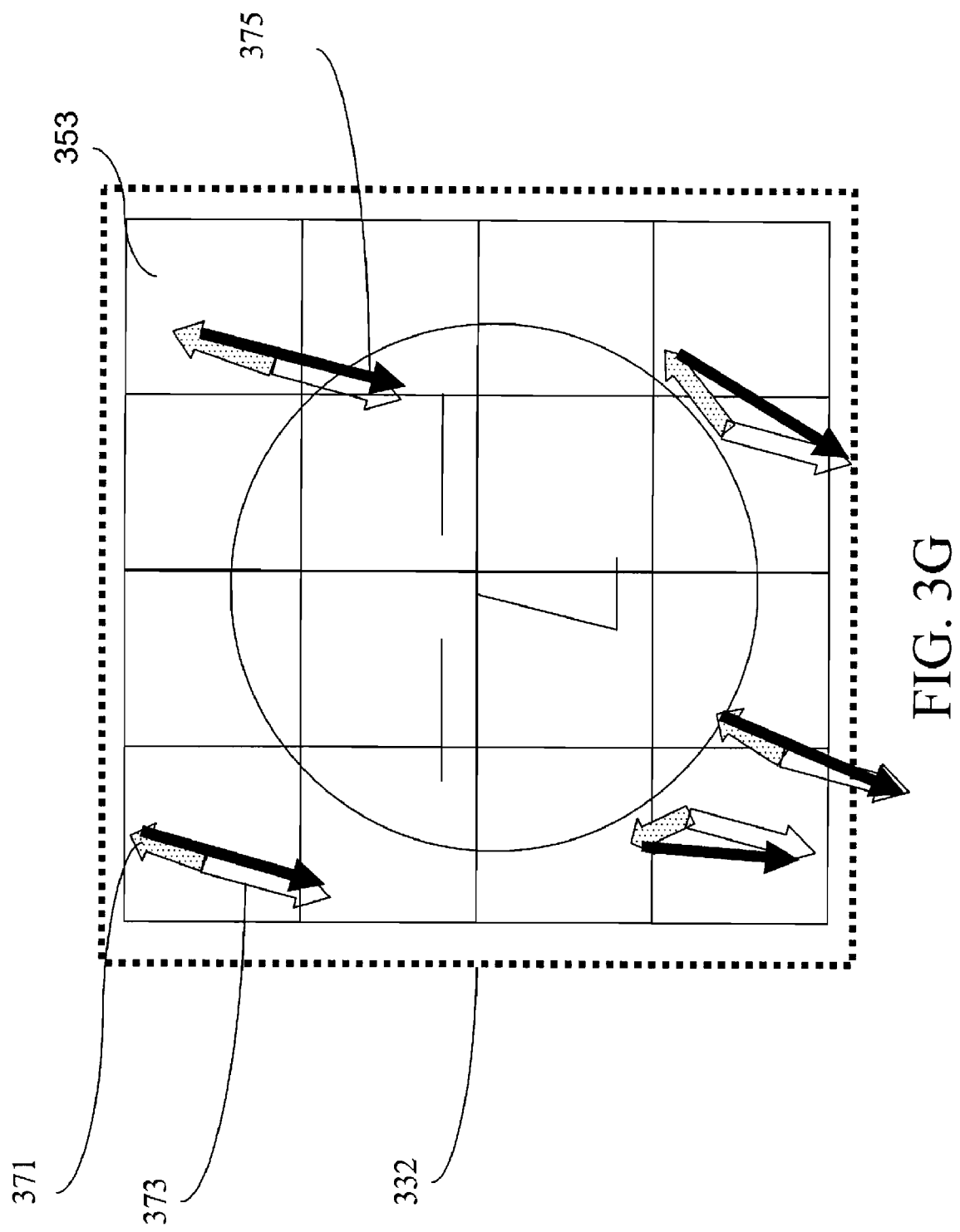
FIG. 3G is a schematic view of corrected foreground motion vectors according to the present invention.

Then, subtracting calculations are performed between the background dominant motion vector and the second dominant motion vectors 371 in the foreground blocks 353, so as to calculate the corrected foreground motion vectors. Referring to FIG. 3G, a schematic view of the corrected foreground motion vectors is shown. In FIG. 3G, the dotted arrows represent the background dominant motion vectors 371 in the foreground blocks 353, and the white arrows represent the background dominant motion vectors 373. In FIG. 3G, subtracting calculations are performed between the second dominant motion vectors 371 in the foreground blocks 353 and the background dominant motion vectors 373, so as to generate foreground motion vectors 375 respectively (black arrows in FIG. 3G). Finally, a condition look-up table is looked up according to the corrected foreground motion vectors 375, so as to adjust the shooting condition during the shooting of the digital image. The shooting condition is the photosensitivity, the aperture value, or the exposure value. For example, when the motion degree of the shot object is less than the sloshing degree of the camera, it is preferable to switch to a larger aperture, so as to prevent the generation of noise due to the directly increased ISO value. The adjusting of the corrected foreground motion vector 375 and the current shooting photosensitivity of the shot object is taken as an example. It is assumed that the current photosensitivity is 100, and the corrected foreground motion vector 375 is in direct multiple proportions to the photosensitivity. When the corrected foreground motion vector 375 is 3, the photosensitivity is adjusted to be 3 times as much as the current value, i.e., 300. If the corrected foreground motion vector 375 is 9 times, the photosensitivity is adjusted to be 9 times as much as the current value.

The present invention provides the identification of the shake of the digital camera and the sloshing of the shot object through motion detection. When the shake of the digital camera is detected, the camera movement vector (i.e., the shake of the digital camera) is subtracted from the object movement vector (i.e., the sloshing of the shot object) in the digital image, so as to obtain the sloshing degree of the shot object. Finally, the digital camera adjusts the shooting condition according to the above result. Thereby, the quality degrade of the digital image caused by the higher shooting condition can be avoided.

What is claimed is:

1. A method for adjusting a shooting condition of a digital camera through motion detection, applied to determine a shooting parameter of a digital camera according to sloshing of the digital camera or a shot object when the digital camera shoots a digital image, the method comprising:

capturing two consecutive frames of pre-capture images, and defining the two frames of pre-capture images as a first pre-capture image and a second pre-capture image respectively;

dividing the first pre-capture image and the second pre-capture image into a plurality of selection blocks, each of the selection blocks corresponding to the same area in the first pre-capture image and the second pre-capture image;

calculating a difference of each of the selection blocks in the first pre-capture image as compared with the second pre-capture image, so as to obtain a motion vector of the selection block;

selecting the motion vectors reaching a first threshold value according to movement amounts of the motion vectors of the selection blocks, and defining the selected motion vectors as first dominant motion vectors;

selecting the first dominant motion vectors reaching a second threshold value according to movement directions of the first dominant motion vectors, and defining the selected first dominant motion vectors as second dominant motion vectors;

setting a foreground area at the same position in the first pre-capture image and in the second pre-capture image, setting other areas as a background area, defining the selection blocks located at the foreground area as foreground blocks, and defining the selection blocks located at the background area as background blocks;

performing a statistic procedure on the second dominant motion vectors in all the background blocks to select a background dominant motion vector;

calculating a corrected foreground motion vector by using the background dominant motion vector and the second dominant motion vectors in the foreground block; and looking up a condition look-up table according to the corrected foreground motion vector, so as to obtain the corresponding shooting parameter.

2. The method for adjusting the shooting condition of the digital camera through motion detection according to claim 1, wherein the shooting parameter comprises:

an aperture value, a photosensitivity, and a shutter speed value.

3. The method for adjusting the shooting condition of the digital camera through motion detection according to claim 1, wherein the setting the foreground area further comprises:

performing a face detection procedure; and circling the area comprising the face in the digital image, so as to generate the foreground area.

4. The method for adjusting the shooting condition of the digital camera through motion detection according to claim 1, wherein the motion vector is generated by using a sum absolution difference (SAD) algorithm or sum of squared difference (SSD).

5. The method for adjusting the shooting condition of the digital camera through motion detection according to claim 1, wherein the statistic procedure is a linear regression process.

* * * * *